United States Patent [19]

Schlough

[11] Patent Number: 4,541,405
[45] Date of Patent: Sep. 17, 1985

[54] HYDRAULIC STONE SHAPING MACHINE

[75] Inventor: Thomas L. Schlough, St. Cloud, Minn.

[73] Assignee: Park Tool Company, St. Cloud, Minn.

[21] Appl. No.: 170,598

[22] Filed: Jul. 21, 1980

[51] Int. Cl.⁴ ............................................. B28D 1/32
[52] U.S. Cl. ................................. 125/23 R; 83/624; 83/636; 83/639; 83/640
[58] Field of Search ............. 125/23 R, 23 C; 83/624, 83/636, 639, 640

[56] References Cited

U.S. PATENT DOCUMENTS

| | | | |
|---|---|---|---|
| 2,452,706 | 11/1948 | White | 125/23 R |
| 2,950,710 | 8/1960 | Lenhart | 125/23 R |
| 3,095,868 | 7/1963 | Mangis | 125/23 C |
| 3,098,476 | 7/1963 | Mayer | 125/23 C |
| 3,120,842 | 2/1964 | Cox et al. | 125/23 C |
| 3,559,631 | 2/1971 | Mangis | 125/23 C |
| 3,677,258 | 7/1972 | Fletcher et al. | 125/23 C |
| 3,756,216 | 9/1973 | Fletcher et al. | 125/23 C |
| 3,809,049 | 5/1974 | Fletcher et al. | 125/23 C |
| 3,820,426 | 6/1974 | Thompson | 83/624 |
| 4,136,593 | 1/1979 | Short | 83/624 |

FOREIGN PATENT DOCUMENTS 436473 of 1912 France .............................. 125/23 R Primary Examiner—Harold D. Whitehead
Attorney, Agent, or Firm—Orrin M. Haugen; Thomas J. Nikolai

[57] ABSTRACT

A machine for cutting a block of stone so as to form a precision straight edge about its perimeter. The machine comprises a stationary base which supports a back-up member which serves as an anvil. Reciprocally mounted on the base is an inside upright assembly which may be raised or lowered by a suitable drive mechanism. Pivotally secured to the inside upright assembly above the anvil is a head member supporting an elongated blade assembly, the blade assembly adapted to be actuated by one or more hydraulic rams disposed in the head assembly and at generally opposite ends of the blade assembly. A block of stone to be cut is positioned on the anvil. The tiltable head assembly is then rotated about its pivot line to direct the action of the upper blade. The blade assembly is lowered so as to be positioned slightly above the upper surface of the stone. By selectively activating one or the other of the power rams, the blade is made to pass through the block of stone in a scissors-like action.

7 Claims, 6 Drawing Figures

HYDRAULIC STONE SHAPING MACHINE

BACKGROUND OF THE INVENTION

I. Field of the Invention

This invention relates generally to stone cutting apparatus and more particularly to the design of a machine for forming a true, precision, straight-line edge across the exposed surface of a slab of granite or other stone.

II. Discussion of the Prior Art

In forming stone plaques, monuments, headstones, etc., a slab of marble, granite or other suitable stone is first roughly cut to substantially the desired size and, subsequently, one or more surfaces of the block are smoothed and polished to yield a desired ornamental appearance. Because the cutting step leaves a somewhat rough edge on the perimeter of the polished surfaces, it is desirable to shape the stone so as to provide the finished surface with a precision straight-line edge around its periphery.

From time immemorial, the edging of decorative stones used as monuments has been a manual operation. Experienced stone cutters, using a scribe and a hammer and chisel have meticulously chipped the stone along a desired line proximate the rough edge to achieve the desired border appearance. This hand operation is quite costly, being labor intensive and slow. Furthermore, months of apprenticeship training are usually required before a person is able to perform the operation without producing excessive rejects. To my knowledge, no one has heretofore devised a machine for obviating this hand labor.

I am aware of various prior art patents relating to stone cutting machines. My own earlier U.S. Pat. Nos. 3,727,600 and 2,912,970, describe machines useful in rough-cutting stone blocks prior to any finishing steps. Furthermore, I am aware of the U.S. Pat. Nos. 3,677,258; and 3,756,216; and 3,809,049, each of which is assigned to the H. E. Fletcher Company of Westford, Mass. For the most part, the above-mentioned Fletcher Patents were granted on various changes made to stone cutting machines which were designed, developed and manufactured by the assignee of the present invention. Again, none of these patents describe a machine which will provide a desired straight-line, precision edge to a block of stone and thereby replace the manual chipping operation performed by skilled artisans.

SUMMARY OF THE INVENTION

In accordance with the teachings of the present invention, there is provided a machine which will allow an operator with little training to form a finished, straight-line, precision edge on a block of stone. The machine, itself, comprises a base or stand which supports an elongated anvil. Pivotally secured to a vertically adjustable inside upright assembly supported by the base and disposed above the anvil is a head member which supports a blade for reciprocal motion therein. The blade is adapted to be operated by a pair of hydraulic power rams which are operatively coupled to the blade and its associated back-up bar. The cutting edge of the blade is directly aligned with the center line of the pivot coupling the head assembly to the inside upright assembly. Furthermore, the power rams are separately controlled, allowing a scissors-like cutting stroke wherein one end of the cutting blade is held relatively fixed while the other end is forced downward by its power ram so as to affect a cutting in much the same fashion as is used in a conventional paper cutter commonly found in schools and offices.

By aligning the cutting edge of the blade with the pivot axis of the head assembly, it is possible to accurately position the cutting blade relative to the edge of a stone and, further, by providing the tilt adjustment to the head, it is possible to obtain a true, precision, straight arris line along the edge of the stone when the power rams are cycled. The variable tilt allows adjustment of the machine so as to remove various amounts of stone from diverse types of stone with differing physical or crystalline characteristics.

OBJECTS

It is accordingly a principal object of the present invention to provide a new and improved machine for forming finished edges on stone blocks.

Another object of the invention is to provide a machine for forming a true, precision edge proximate a rough formed edge on a block of stone.

Still another object of the invention is to provide in a stone finishing machine an arrangement wherein the angle of descent of a cutting blade relative to a stone block to be edged may be adjusted.

A yet still further object of the invention is to provide a stone cutting machine in which a cutting blade is made to function with a scissors-like motion as the blade is brought into contact with the stone block to be edged.

These and other objects, advantages and features of the invention will become more apparent to those skilled in the art from the following detailed description of a preferred embodiment when considered in conjunction with the accompanying drawings in which like numerals in the several views refer to corresponding parts.

DESCRIPTION OF THE PREFERRED EMBODIMENT

Figure 1:
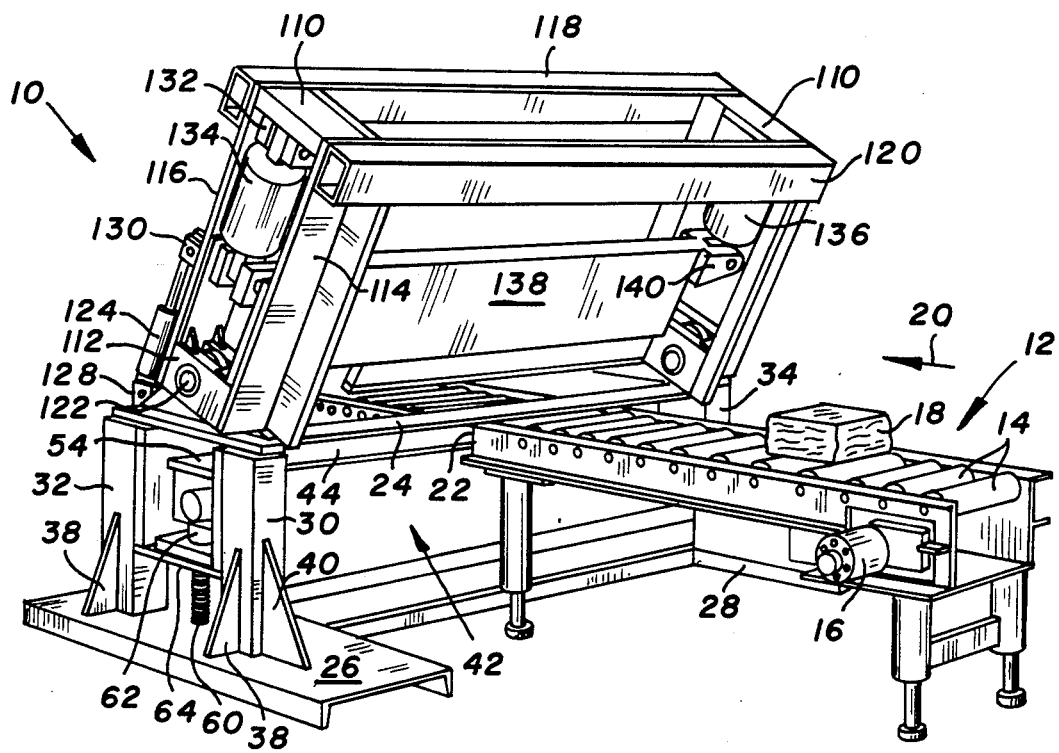
FIG. 1 is a perspective view of the stone cutting machine of the present invention as viewed from the rear.

Referring first to FIG. 1, the machine for forming a true edge or arris on a block of stone is indicated generally by numeral 10. Associated with the machine, but not forming an integral part thereof is a conveyor apparatus indicated generally by numeral 12, the conveyor having a plurality of driven rollers as at 14, the driving force being provided by an electric or hydraulic motor 16. A block of granite or other stone to be edged is identified by numeral 18 and it rests upon the conveyor 12 and is to be moved in a direction indicated by the arrow 20. The front edge 22 of the conveyor 12 abuts a back-up bar or anvil member 24 which is a part of the stone edging machine 10. Hence, the block 18 may be transported by the conveyor onto the anvil and positioned by the operator with a minimum of effort. While not shown in the drawings, mounted on the machine is a laser lamp projector which illuminates a straight-line trace across the face of the stone to facilitate positioning of the stone relative to the cutting blade.

The stone edging machine 10 includes a base assembly having platforms 26 and 28 proximate the opposed side edges of the machine, the platforms being formed from suitable steel channel of sufficient strength to support the weight of the machine as it rests upon the floor. Extending upwardly from platform 26 are vertical angle-iron posts 30–32. Similarly, angle-iron posts 34–36 extend upwardly and perpendicular to the platform 28. Triangular plates or gussets, as at 38–40, are welded to the vertical posts and to the platform and serve to increase the strength and rigidity of the base.

Mounted for reciprocal movement within the four vertical angle-iron posts 30–32 and 34–36 on the opposite ends of the machine is an inside upright assembly which is more particularly shown and described in connection with FIGS. 5 and 6 herein. Suffice it now to say that the inside upright assembly supports an upper tiltable head assembly.

Figure 2:
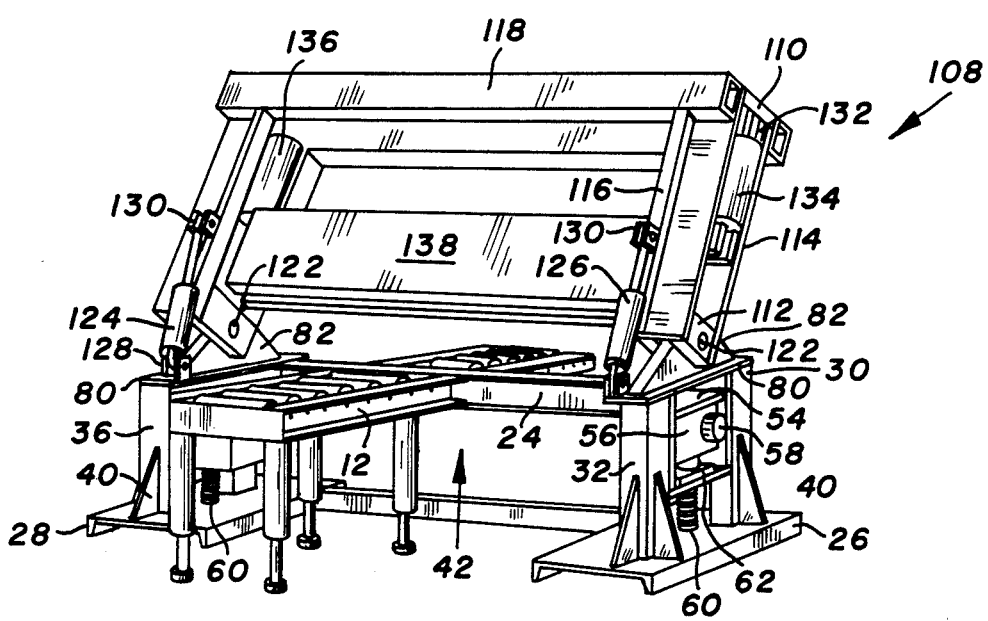
FIG. 2 is a perspective view of the preferred embodiment as observed from the front.

In FIGS. 1 and 2, the anvil member 24 is shown as a part of back-up bar means, indicated generally by numeral 42, which and includes an elongated steel bar 44 (FIG. 4) which is welded between opposed end plates 46 and 48, the end plates being further welded proximate their lower edge to a structural steel channel 50 which, in turn, is welded to the platforms 26 and 28. Extending outwardly from the vertical side edges of the back-up bar 44 are flange plates 52 and 54, these plates also being welded in position on the back-up bar as indicated.

Figure 3:
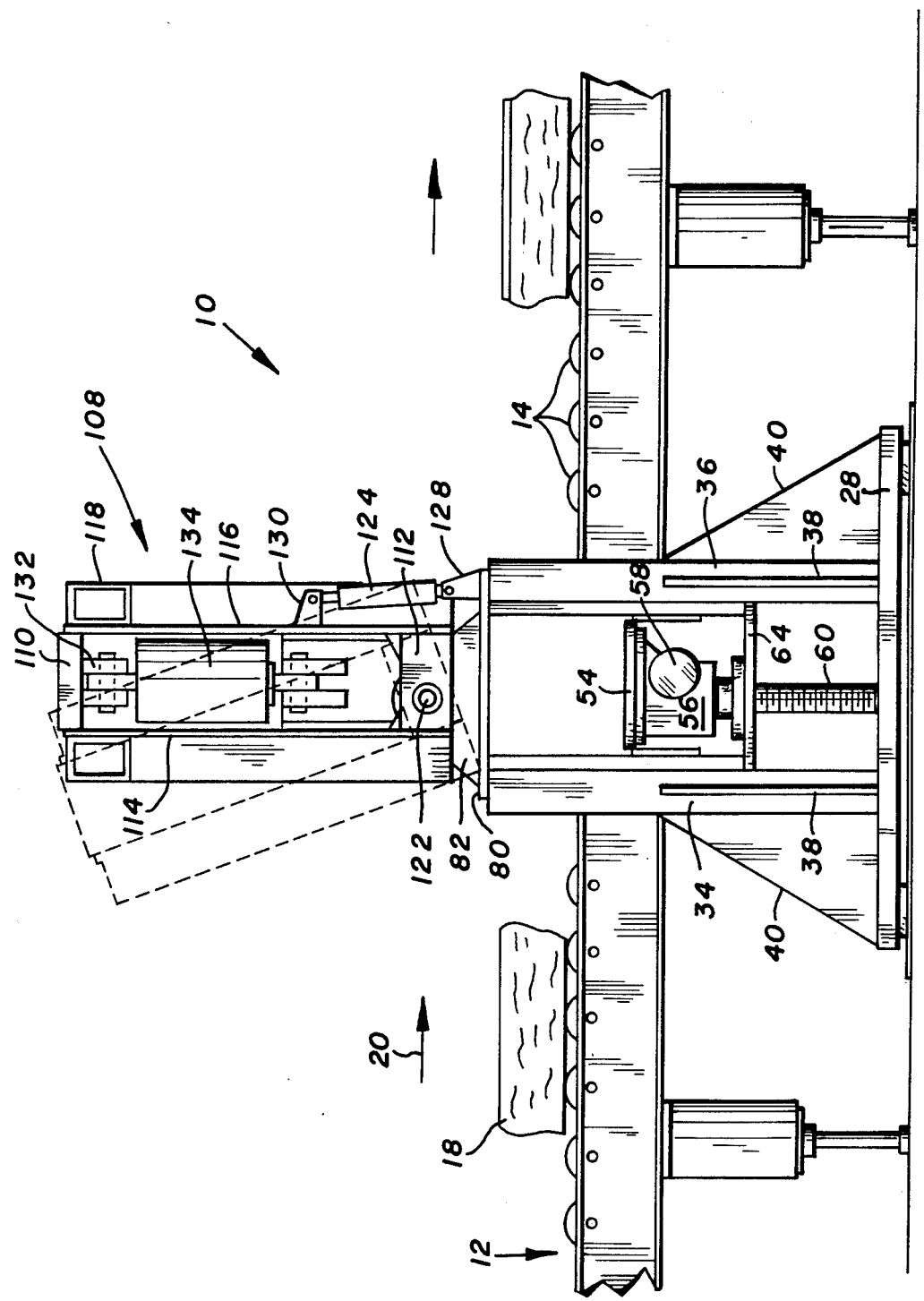
FIG. 3 is a side view of the preferred embodiment wherein the tiltable head is represented in a vertical position by means of a solid line presentation and in a tilted orientation by means of ghost lines.

As shown in the side view of FIG. 3, bolted to the underside of the flange plates 52 and 54 is a jack-screw assembly 56 which is adapted to be operated by an electric or hydraulic motor 58 so as to rotate a threaded jack-screw 60. The jack-screw 60 passes through a traveling nut 62 which may be welded, bolted or otherwise affixed to a base plate 64 which forms a part of the inside upright assembly which is more particularly set forth in the drawings of FIGS. 5 and 6. The screws turn but do not travel through the plates 52–54.

Figure 6:
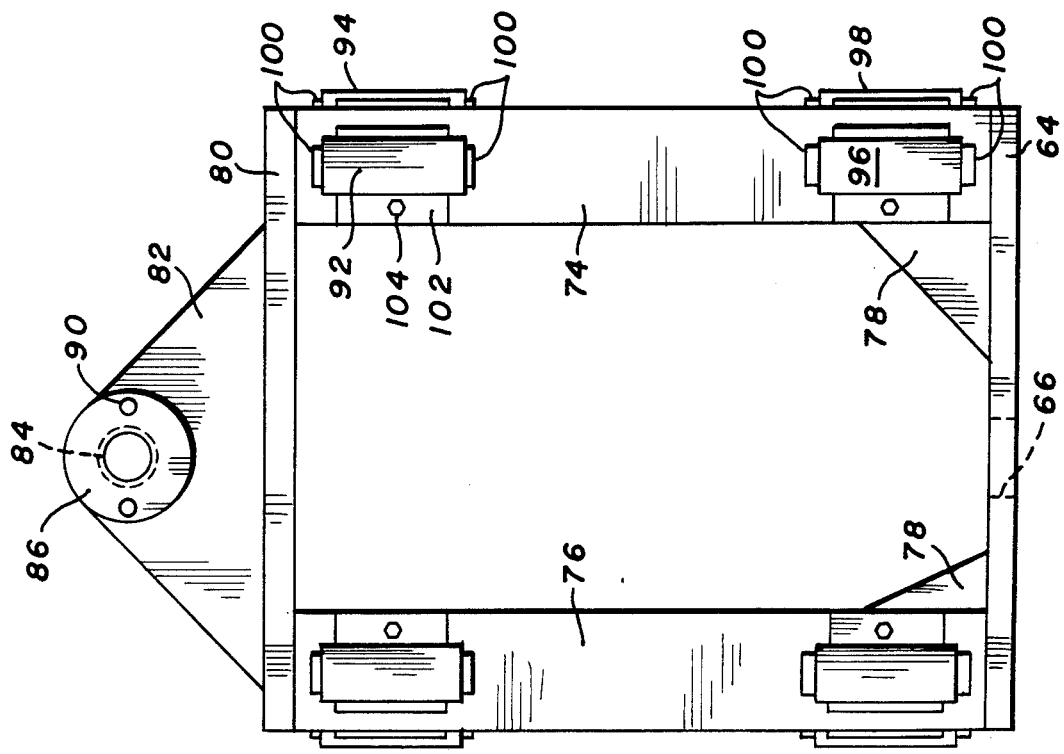
FIG. 6 is a right side view of the assembly of FIG. 5.
Figure 5:
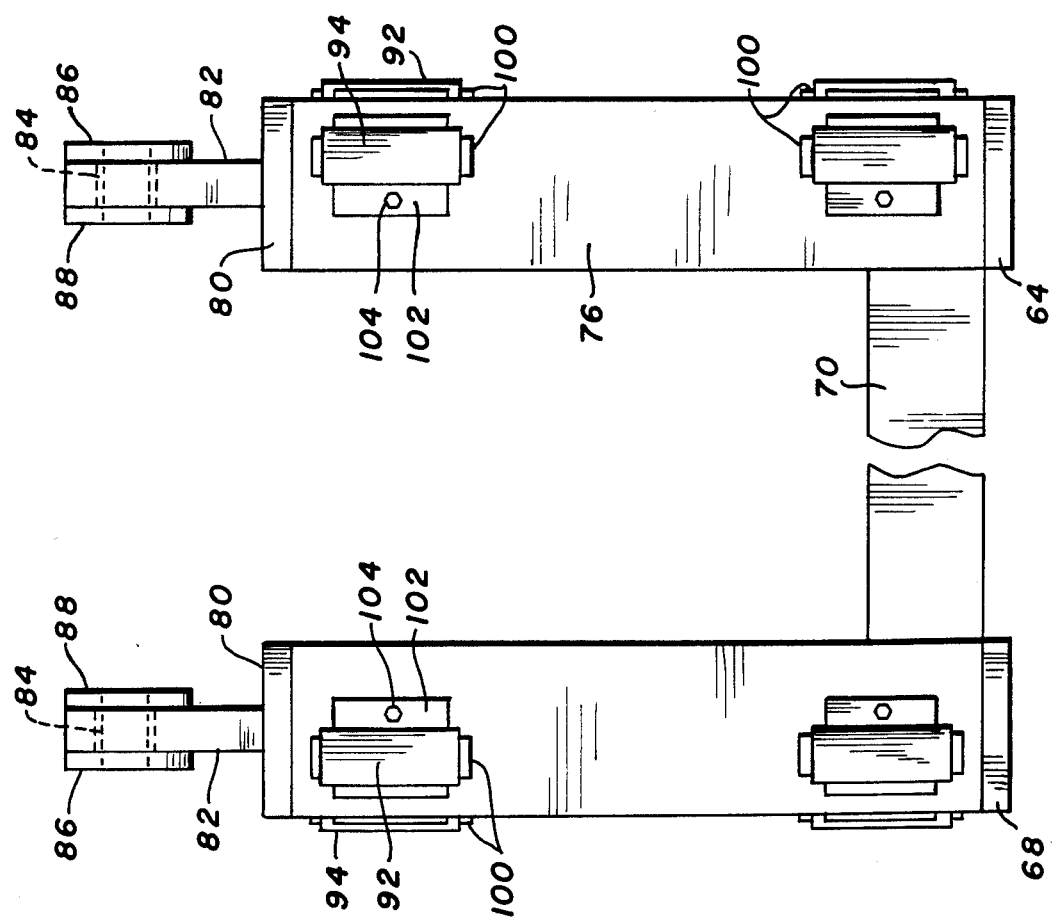
FIG. 5 is a plan view of the inside upright assembly.

With reference, then, to the drawings of FIGS. 5 and 6, the details of the inside upright assembly will be set forth. In that the assembly is generally symmetrical, the details of construction of only one end thereof need be set out, it being understood that the opposite end of the inside upright assembly is similarly constructed. As can best be seen in FIG. 6, the base plate 64 of the inside upright assembly includes a central aperture 66 through which the jack-screw shaft 60 is arranged to pass. Attached to the base plate 64 and extending across the length of the machine to the corresponding base plate 68 on the opposite end thereof are first and second tubular structural steel members 70 and 72 which serve to tie the two ends of the inside upright assembly together in a rigid framework.

Welded to the base plates 64 and 68 and extending vertically and perpendicularly to the plane of these base plates are two vertical members 74 and 76 which are also preferably formed from rectangular tubing. For additional strength, triangular gussets, as at 78, may be welded in place as indicated. Extending transversely across the upper ends of the vertical rectangular tubular posts 74 and 76 is an upper support plate 80 which, when welded to these posts, serves to maintain the posts in a parallel, spaced apart relationship while adding further structural rigidity. A generally triangular shaped steel plate 82 is welded to the upper surface of the support plate 80 and formed through the thickness dimension of this plate is a circular aperture, it being located proximate the apex of the triangle. Disposed within this aperture is a self-aligning sleeve bearing 84 which bearing is held in place by a pair of circular steel plates 86 and 88 positioned on opposite side surfaces of the plate 82 which also have concentric apertures in them. These retainers are preferably held in place by means of bolts as at 90.

Figure 4:
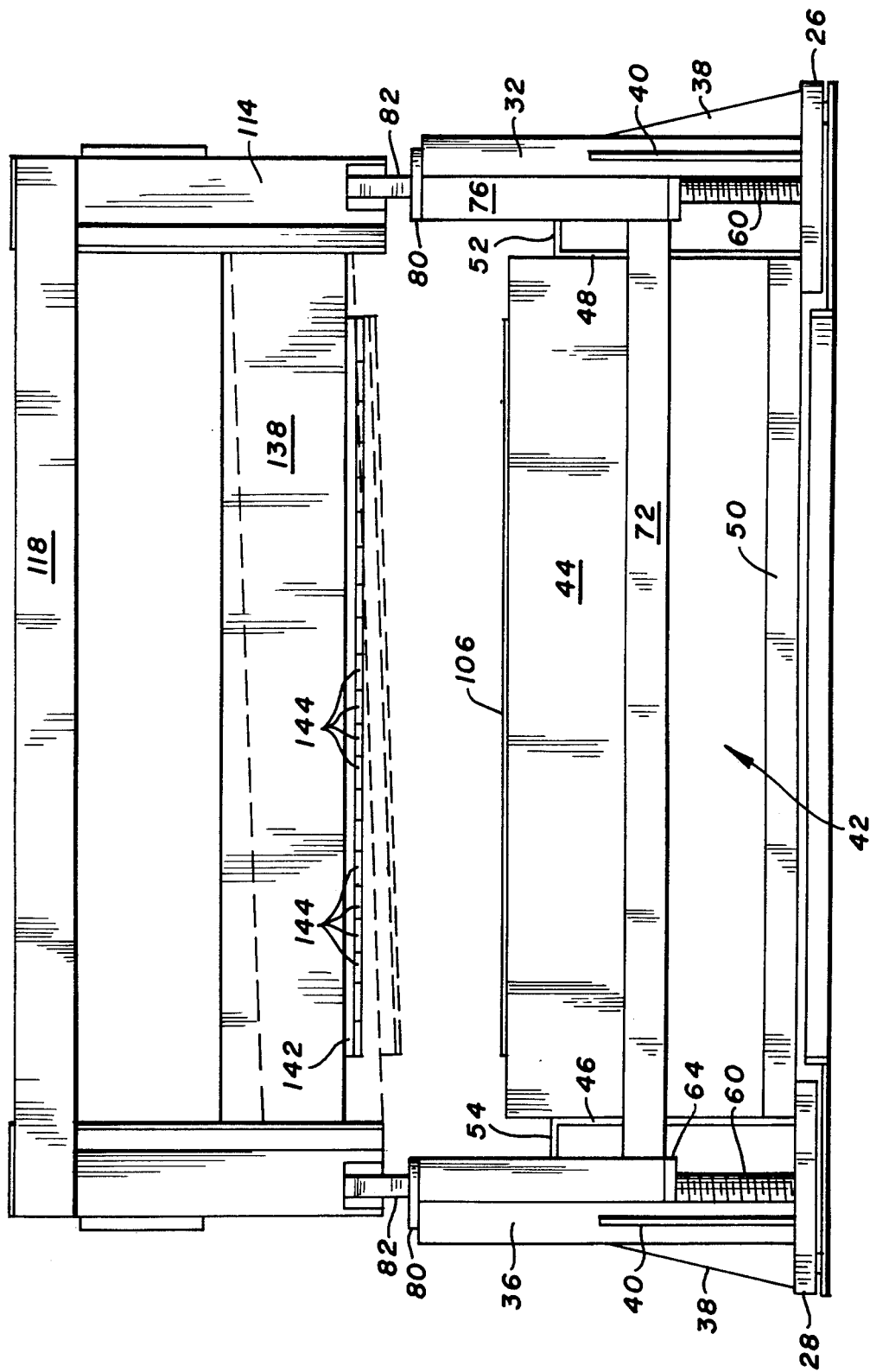
FIG. 4 is a front view of the preferred embodiment illustrating the cutting or shearing action of the blade member.

As can best be seen in FIG. 4, the inside upright assembly is dimensioned to fit within the confines defined by the vertical angle-iron support legs 30–32 and 34–36 with the tubular members 70 and 72 extending substantially the full length dimension of the machine. Furthermore, the inside upright assembly is designed to move reciprocably, up and down, relative to the stationary outer upright posts 30–32 and 34–36. As such, it is desirable to provide a bearing surface between the mating faces of the angle-iron posts and the tubular rectangular vertical uprights forming the inside upright assembly. With reference to FIGS. 5 and 6, it can be seen that each of the vertical posts as at 74 and 76 has a pair of bearing pads disposed proximate its opposed ends. Specifically, the vertical post 74 of the inside upright assembly has bearing pads 92 and 94 proximate its upper end and further bearing pads 96 and 98 proximate its lower end. These bearing pads are wedged between small rectangular bar elements 100 which are welded to the adjacent faces of the vertical uprights. A backing plate 102 traps the bearing pads in position. The bearings are retained in position by the closeness of the fit between the angle irons as at 32 and 36 and the posts 70–72. The plates 102 may be held to the vertical posts by means of a bolt as at 104.

As is indicated in FIGS. 3 and 4, when the inside upright assembly is positioned in place relative to the outside angle-iron vertical legs attached to the base or platform members, and with the jack-screw passing through the aperture in the base plate 64 and engaging the traveling nut 62, as the motor 58 is driven, then, the inside upright assembly will move up and down, depending upon the direction of rotation of the jack-screw 60. The bearing surfaces provided on the vertical posts of the inside upright assembly facilitate the free movement of that assembly relative to the stationary base elements.

The upper edge surface of the back-up bar 44 acts as an anvil and it is preferably covered with a hard, rubber-like strip 106 (FIG. 4) having high restorative properties such that when subjected to high compressive forces, it will return to its unstressed condition once those forces are removed. This rubber-like surface prevents scratching or other defacement of polished surfaces of stones as they are being edged and further serves to inhibit slipping of the stone during an edging operation.

With reference to FIGS. 2 and 3, it can be seen that the stone edging machine of the present invention further includes a tiltable head assembly which is referred to generally by numeral 108. In that the opposed ends of the head assembly 108 are substantially identical in construction, only one of them need to be described. With this in mind, then, it can be seen that the head assembly comprises an upper spacer plate 110 and a pair of lower spaced-apart spacer plates 112 and 113, the upper and lower spacer plates being sandwiched between opposed side plates 114 and 116. These parts are preferably connected by weldments and the left and right sides of the head assembly are coupled together by means of transversely extending rectangular steel tubular members 118 and 120, these too being held to their mating parts by welding.

The tilting head framework just described is arranged to be mounted on the inside upright assembly by a pivot connection. Specifically, aligned holes are formed through the lower spacer plates 112 and 113 and a pivot pin 122 is made to pass through these holes and through the self-aligning bearing 84 formed in the triangular plate 82 welded to the upper plate 80 of the inside upright assembly. The triangular plate extends between the lower spacer plates 112 and 113. In view of FIG. 3, the head assembly 108 is shown in a generally vertical orientation with respect to the base by a solid line representation and in a tilted orientation by phantom lines. The tilting of the head assembly 108 is controlled by first and second hydraulic cylinders 124 and 126 which are operatively connected between a pivot mount 128 welded to the top plate 80 of the inside upright assembly and a similar pivot mount 130 welded to a side plate, such as 116, on each end of the machine. By operating the cylinders 124 and 126 in unison, then, the angle of tilt of the head assembly 108 can be adjusted.

The tiltable head assembly thus far described is a structural means whereby the blade assembly can be supported for reciprocatory movement. Welded to the underside of each of the upper spacer plates 110 on each end of the head assembly is a clevis, as at 132, for pivotally connecting one end of the hydraulic power rams 134 and 136 to the opposite ends of the framework. The other ends of these hydraulic power rams are adapted to be coupled, again preferably by a pin and clevis-type connection to an upper back-up bar assembly 138. The upper back-up bar itself may comprise an elongated steel plate, typically twelve inches wide and two inches thick and having an apertured plate as at 140 welded to opposed end edges thereof, thereby allowing it to be joined to one end of each of the rams 134 and 136 by a suitable pin.

The upper back-up bar 138 is guided in its reciprocatory travel by means of bearing pads mounted on the end portions of the upper back-up bar so as to cooperate with the side surfaces of the vertical plates 114 and 116. The bearing pads may be like bearings 96 on the inside upright assembly.

Secured to the bottom edge of the upper back-up bar 138 is a blade assembly which includes an elongated steel bar 142 which is bolted in place on the underside edge of the back-up bar 138 and is drilled vertically at a plurality of points along its length dimension. The cutting blade itself is comprised of a plurality of individual segments 144 aligned end-to-end and each segment may typically be twelve inches long. These blade segments are secured to the underside of the square steel bar 142, preferably by means of socket head cap screws (not shown) which pass through the aforementioned holes formed through the bar and into tapped holes in the blade segments. By providing a segmented blade in the fashion described, it is more convenient and inexpensive to remove individual segments for sharpening or replacement as they become worn and obviating the need to remove or replace the entire blade. Furthermore, by mounting the plural blade segments on the bar 142, it is easy to replace the entire blade assembly with a like assembly while the first is being refurbished.

The machine is dimensioned such that the working edge of the cutting blade is precisely aligned with the axis of the pivot pin 122 and, as such, the force of the power ram is always directed through the working edge irrespective of the angle of inclination of the tiltable head 108 with respect to the vertical.

This completes a description of the overall construction of the stone edging machine of the present invention and consideration will next be given to its mode of operation.

OPERATION

In use, blocks of stone to be worked upon so as to provide them with a smooth arris line are placed on the conveyor 12 and the motor 16 is operated to move the stone 18 onto the rubberized upper edge surface 106 of the back-up bar or anvil 44. The stone is then manually aligned with a reference marker which preferably takes the form of a pencil-thin beam of laser light focused on the upper surface of the block 18. Once so positioned, the motor 58 associated with the power jack-screws 56 on each end of the machine is energized to raise or lower the tiltable head assembly to accommodate stones of differing thicknesses. Energization of the motor 58 drives the screws 60 which, in turn, cooperates with the traveling nuts 62 which are fixedly secured to the lower support plates 64 of the inside upright assembly. This raises or lowers that assembly relative to the stationary base comprised of the platforms 26–28 and the vertical angle-iron posts 30–32 and 34–36. The head is lowered until the working edge of the blade is positioned a slight distance above the upper surface of the stone to be trimmed.

Based to a certain extent upon experience with the machine and the type of stone being worked upon, the operator next activates the tilt cylinders 124 and 126 so as to incline the tiltable head 108 to a desired angle.

Following this operation, the machine operator next energizes the power rams 134 and 136 only to the extent necessary to bring the working edge of the cutting blade 144 into registration with a line running parallel to the rough edge of the block to be trimmed but offset inwardly slightly from that edge. With the blade in contact with the block and with the block supported on the back-up bar, the operator next energizes one or the other of the hydraulic power rams 134 and 136 causing the one end of the upper back-up bar 138 associated with the activated ram to descend while the opposite end of the back-up bar 138 remains relatively fixed, except, of course, for the rotational movement of that end relative to the pin and clevis connection securing it to the unenergized ram. As the working edge of the cutting blade is forced downward, the stone is effectively sheared starting at one side edge and progressing toward the opposite side edge thereof. The phantom lines in FIG. 4 show the manner in which the blade is rotated about one end during the cutting stroke. This shearing action has been found to yield a precision cut equal or better to that which has heretofore been obtained by skilled stone masons using the manual hammer and chisel technique.

Once the first edge is formed, the power rams 134 and 136 are de-energized and the operator may rotate the block 18 90° so as to present an adjacent rough edge to the machine. The sequence of steps of lowering the tiltable head assembly with the jack-screw 56–60, selectively adjusting the angle of tilt with the hydraulic cylinders 124 and 126, bringing the working edge of the cutting blade into abutment with the surface of the block 18 to be edged and finally energizing one or the other of the two power rams 134 or 136 to effect the cutting stroke is repeated for all four sides of the block.

It should be readily apparent that if the operator desires to do so, he may actuate both power rams 134 and 136 simultaneously so as to effect a shearing of the edge from the stone by a translation of the blade rather than by rotating it about one end. However, the results achieved by the one-sided actuation are quite remarkable and that type of operation is recommended.

The power rams 134 and 136 are preferably of a type that will provide up to twenty tons of force. In that a force of that magnitude may be applied to the block resting upon the lower back-up bar 44, it is necessary that the jack-screws 60 be designed so as to support weights of that magnitude. Similar design considerations must be taken into account when fabricating the remaining structural members of the machine.

This invention has been described herein in considerable detail, in order to comply with the Patent Statutes and to provide those skilled in the art with the information needed to apply the novel principles, and to construct and use such specialized components of the invention as are required. However, it should be understood that the invention can be carried out by specifically different arrangements of the structural members and with alternative devices. For example, rather than employing a jack-screw to raise and lower the tiltable head assembly, it would be possible to employ a series of wedges or equivalent machine components. Thus, various modifications, both as to equipment details and operating procedures can be effected without departing from the spirit and scope of the invention itself.

What is claimed is:

1. Apparatus for forming a smooth straight edge along an elongated stone slab, comprising, in combination:
   (a) a base member;
   (b) a head member connected to said base member to define a blade travel path which lies in a plane forming a variable angle with respect to said base member;
   (c) means for varying the magnitude of said variable angle;
   (d) an anvil member carried by said base member for supporting a slab of stone so that said plane intersects the slab along a desired line;
   (e) a straight blade at least as long as the desired line on said slab;
   (f) means mounting said blade in said head member for movement along said blade travel path; and
   (g) power applying means connected between said head member and said base member at opposite ends of said blade for causing said movement of said blade.

2. Apparatus as in claim 1 wherein said base member comprises:
   (a) platform means;
   (b) a plurality of post members attached to said platform means at the respective corners of a rectangle;
   (c) an inside upright assembly mounted for reciprocal vertical movement relative to said platform means and guided by said plurality of post members; and
   (d) means attaching said head member to said inside upright assembly for movement therewith.

3. Apparatus as in claim 2 and further including a motor driven jack-screw means operatively coupled between said platform means and said inside upright assembly for providing said reciprocal vertical movement to said inside upright assembly.

4. Apparatus as in claim 2 wherein said head member comprises:
   (a) a pair of end members; and
   (b) an elongated cross-member connecting said pair of end members in parallel, spaced-apart relation, said cross-member extending parallel to said anvil and said pair of end members being pivotally coupled to opposed ends of said inside upright assembly.

5. Apparatus as in claim 4 wherein said power applying means comprises first and second hydraulic rams and wherein said head member further includes:
   (a) blade back-up means;
   (b) means coupling said first and second hydraulic rams between said end members and said blade back-up means; and
   (c) means attaching said blade member to said blade back-up means such that the working edge of said blade member is positionable generally colinearly with the axis of the pivot coupling between said end members and said inside upright assembly.

6. Apparatus as in claim 5 wherein said first and second power rams are independently controllable.

7. Apparatus as in claim 5 wherein said blade member comprises a plurality of blade segments aligned along said blade back-up means.

* * * * *